(12) United States Patent
Nurse et al.

(10) Patent No.: US 8,931,501 B2
(45) Date of Patent: Jan. 13, 2015

(54) DEVICES AND METHODS FOR FLOW CONTROL IN MICROFLUIDIC STRUCTURES

(75) Inventors: James C. Nurse, Pleasanton, CA (US); John R. Van Camp, San Ramon, CA (US)

(73) Assignee: Applied Biosystems, LLC, Carlsbad, CA (US)

( * ) Notice: Subject to any disclaimer, the term of this patent is extended or adjusted under 35 U.S.C. 154(b) by 781 days.

(21) Appl. No.: 11/960,035

(22) Filed: Dec. 19, 2007

(65) Prior Publication Data

US 2008/0163945 A1 Jul. 10, 2008

Related U.S. Application Data

(60) Provisional application No. 60/871,066, filed on Dec. 20, 2006.

(51) Int. Cl.
| | | |
|---|---|---|
| G05D 16/08 | (2006.01) | |
| F16K 99/00 | (2006.01) | |
| B01L 3/00 | (2006.01) | |
| F15C 3/00 | (2006.01) | |
| B01L 7/00 | (2006.01) | |

(52) U.S. Cl.
CPC ....... *F16K 99/0065* (2013.01); *B01L 3/502738* (2013.01); *B01L 3/502746* (2013.01); *F15C 3/002* (2013.01); *B01L 7/52* (2013.01); *B01L 2200/0647* (2013.01); *B01L 2200/141* (2013.01); *B01L 2300/0654* (2013.01); *B01L 2300/088* (2013.01); *B01L 2400/0672* (2013.01); *B01L 2400/086* (2013.01)

USPC .......... 137/67; 137/199; 137/251.1; 137/388; 137/467.5; 137/494; 210/418

(58) Field of Classification Search
USPC ........... 137/2, 67, 78.3, 468, 825, 494, 251.1, 137/197, 199; 210/418
See application file for complete search history.

(56) References Cited

U.S. PATENT DOCUMENTS

| | | | | |
|---|---|---|---|---|
| 2,877,791 | A * | 3/1959 | Rich | 137/487 |
| 3,438,179 | A * | 4/1969 | Jouault | 95/22 |
| 5,730,187 | A * | 3/1998 | Howitz et al. | 137/803 |
| 5,789,045 | A * | 8/1998 | Wapner et al. | 428/34.4 |
| 5,869,004 | A | 2/1999 | Parce et al. | |
| 6,152,181 | A * | 11/2000 | Wapner et al. | 137/807 |
| 6,488,896 | B2 | 12/2002 | Weigl et al. | |
| 6,491,666 | B1 * | 12/2002 | Santini et al. | 604/191 |

(Continued)

OTHER PUBLICATIONS

Richter et al., "Influence of volume phase transition phenomena on the behavior of hydrogel-based valves," *Sensors and Actuators B*, 99 (2004) pp. 451-458.

(Continued)

*Primary Examiner* — William McCalister

(57) ABSTRACT

An apparatus for controlling flow in a fluid flow path can include a chamber containing an expandable material, the expandable material being configured to expand out of the chamber into a portion of the fluid flow path so as to at least partially block the fluid flow path. The apparatus also can include at least one structure providing flow communication between the chamber and the fluid flow path. The at least one structure can be configured to pass the expandable material from the chamber to the portion of the fluid flow path during expansion so as to control a rate at which the expandable material expands into the portion of the fluid flow path.

12 Claims, 3 Drawing Sheets

FIG. 3A

(56) References Cited

U.S. PATENT DOCUMENTS

| | | | |
|---|---|---|---|
| 6,523,559 B2 * | 2/2003 | Beebe et al. | 137/3 |
| 6,575,188 B2 * | 6/2003 | Parunak | 137/251.1 |
| 6,613,581 B1 | 9/2003 | Wada et al. | |
| 6,626,417 B2 | 9/2003 | Winger et al. | |
| 6,648,836 B2 * | 11/2003 | Cohen et al. | 600/573 |
| 7,506,658 B2 * | 3/2009 | Guest et al. | 137/78.3 |
| 2002/0033193 A1 | 3/2002 | McNeely et al. | |
| 2004/0112435 A1 * | 6/2004 | Olander | 137/487.5 |
| 2005/0034990 A1 * | 2/2005 | Crooks et al. | 204/450 |
| 2005/0087231 A1 * | 4/2005 | Sanders et al. | 137/489.5 |
| 2005/0097951 A1 | 5/2005 | Hasselbrink, Jr. et al. | |

OTHER PUBLICATIONS

Printout of http://www.gesim.de/Products/MicroValves/microvalves.htm web page obtained from web Dec. 2006.

Printout of GeSiM Brochure for Hydrogel Valves, Dead-Volume-Free Microfluidic Switches, obtained from http://www.gesim.de/Products/MicroValves/microvalves.htm, Brochure dated Dec. 2003, 2 pages.

U.S. Appl. No. 11/380,327, filed Apr. 26, 2006, entitled Systems and Methods for Multiple Analyte Detection.

International Search Report and Written Opinion of the International Searching Authority for Int'l Application No. PCT/US07/88223 dated May 5, 2008.

* cited by examiner

DEVICES AND METHODS FOR FLOW CONTROL IN MICROFLUIDIC STRUCTURES

CROSS-REFERENCE TO RELATED APPLICATION

This application claims a priority benefit under 35 U.S.C. §119(e) from U.S. Patent Application No. 60/871,066 filed Dec. 20, 2006, which is incorporated herein by reference.

FIELD

The present teachings relate to devices and methods for distributing a fluid, such as a biological fluid sample, for example. More specifically, the present teachings relate to devices and methods for controlling the flow of a fluid in a microfluidic structure.

BACKGROUND

Microfluidic devices are increasingly being used in a variety of settings to perform various chemical and physical processes. Applications include, but are not limited to, biochemical testing instrumentation, industrial process control equipment, and ink jet technology. Biochemical testing for research and diagnostic applications often involves performing assays including a large number of analytes in conjunction with one or a few biological samples. In some cases, it may be desirable to analyze one or a few biological samples using a single test device with a large number of analytes while requiring a small amount of sample. To this end, biochemical testing is increasingly being performed using microfluidic devices that define a network of microfluidic flow structures, including, for example, chambers, wells, channels, reservoirs, and other microfluidic flow structures.

It may be desirable to distribute one or more biological samples and/or analytes within a substrate defining a network of microfluidic flow structures and to control the flow of those distributed fluids via flow control mechanisms. Further, it may be desirable to isolate (e.g., seal from gases and/or liquids) various portions of the microfluidic flow structures while performing a chemical reaction, such as, for example, a polymerase chain reaction (PCR) and/or while otherwise processing the sample, including, for example, sample preparation. Isolation of biological sample and/or chemical assays within a substrate or other biological testing device may be desirable to avoid cross-contamination of various substances within a biological testing device, such as, for example, a microfluidic substrate which defines a network of sample distribution channels and chambers. Various techniques have been used to achieve isolation, such as, for example, mechanically deforming a laminate layer of the substrate.

It may be desirable, however, to provide a mechanism to achieve flow control and/or isolation of chambers, channels and/or other microfluidic flow structures of microfluidic device that does not rely on mechanical and/or external actuation devices. It also may be desirable to provide a mechanism to achieve flow control and/or isolation that reduces wear. It may further be desirable to provide a mechanism for achieving isolation and/or flow control (e.g., valving) that provides control over the rate at which the isolation and/or valving occurs, and/or that permits the passage of some gases and/or liquids while preventing the passage of other gases and/or liquids, and/or that permits diffusion of some gases and/or liquids. Additionally, it may be desirable to provide a relatively inexpensive mechanism to achieve isolation and/or flow control that is relatively easy to manufacture and use.

SUMMARY

Exemplary embodiments according to teachings of the present disclosure may satisfy one or more of the above-mentioned desirable features. Other features and advantages will become apparent from the detailed description which follows.

In various embodiments, the present teachings may provide an apparatus for controlling flow in a fluid flow path that includes a chamber containing an expandable material. The expandable material can be configured to expand out of the chamber into a portion of the fluid flow path so as to at least partially block the fluid flow path. The apparatus may further include at least one structure providing flow communication between the chamber and the fluid flow path. The at least one structure can be configured to pass the expandable material from the chamber to the portion of the fluid flow path during expansion so as to control a rate at which the expandable material expands into the portion of the fluid flow path.

According to yet other exemplary embodiments, the present teachings can include a microfluidic device comprising at least one apparatus for controlling flow as set forth above and at least one chamber in flow communication with the fluid flow path, the at least one chamber being configured to receive a fluid for biological testing.

Yet other exemplary embodiments of the present teachings include an apparatus for controlling flow in a fluid flow path including a chamber containing an expandable material. The expandable material may be configured to expand out of the chamber into a portion of the fluid flow path so as to at least partially block the fluid flow path. The apparatus also may include at least one structure providing flow communication between the chamber and the fluid flow path, the at least one structure being configured to extrude the expandable material from the chamber to the portion of the fluid flow path during expansion.

In yet other exemplary embodiments, a method of controlling flow in a microfluidic device may include flowing a substance along a fluid flow path of the microfluidic device, expanding an expandable material into a portion of the fluid flow path so as to at least partially block the fluid flow path, and passing the expandable material through a structure in flow communication with the portion of the fluid flow path so as to control a rate at which the expandable material expands into the portion of the fluid flow path.

Additional embodiments are set forth in part in the description that follows, and in part will be apparent from the description, or may be learned by practice of the various embodiments described herein.

BRIEF DESCRIPTION OF THE DRAWINGS

Various embodiments of the present teachings are exemplified in the accompanying drawings. The teachings are not limited to the embodiments depicted, and include equivalent structures and methods as set forth in the following description and known to those of ordinary skill in the art. In the drawings.

Figure 1:
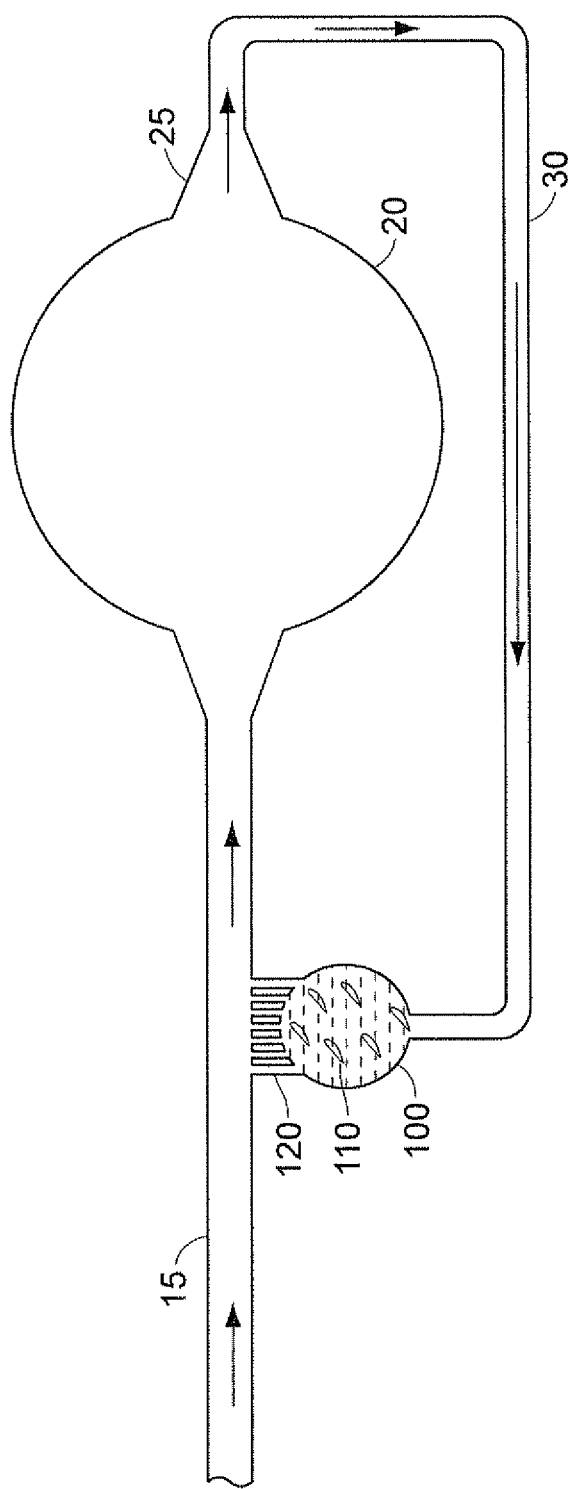
FIG. 1 is a plan view of a flow control mechanism in a microfluidic device according to an exemplary embodiment of the present teachings.

It is to be understood that both the foregoing general description and the following detailed description are exemplary and explanatory only and are intended to provide a further explanation of the various embodiments of the present teachings.

DESCRIPTION OF VARIOUS EMBODIMENTS

In this application, the use of the singular includes the plural unless specifically stated otherwise. In this application, the use of "or" means "and/or" unless stated otherwise. Furthermore, the use of the term "including", as well as other forms, such as "includes" and "included", is not limiting. Also, terms such as "element" or "component" encompass both elements and components comprising one unit and elements and components that comprise more than one subunit unless specifically stated otherwise. Wherever possible, the same reference numbers will be used throughout the drawings to refer to the same or like parts.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Moreover, all numerical ranges disclosed herein are to be understood to encompass any and all subranges subsumed therein. For example, a range of "less than 10" includes any and all subranges between (and including) the minimum value of zero and the maximum value of 10, that is, any and all subranges having a minimum value of equal to or greater than zero and a maximum value of equal to or less than 10, e.g., 1 to 5.

It is noted that, as used in this specification and the appended claims, the singular forms "a," "an," and "the" include plural referents unless expressly and unequivocally limited to one referent. Thus, for example, reference to "a layer" may include two or more different layers. As used herein, the term "include" and its grammatical variants are intended to be non-limiting, such that recitation of items in a list is not to the exclusion of other like items that can be substituted or added to the listed items.

The section headings used herein are for organizational purposes only, and are not to be construed as limiting the subject matter described. All documents cited in this application, including, but not limited to patents, patent applications, articles, books, and treatises, are expressly incorporated by reference in their entirety for any purpose.

Exemplary embodiments of the disclosure provide flow control mechanisms that include an expandable material configured to expand within a microfluidic structure for controlling the flow of fluid being distributed throughout a microfluidic device having one or more microfluidic flow structures, such as, for example, chambers, channels, reservoirs, wells, and other structures for flowing fluid and/or containing fluid. The flow control mechanisms in accordance with the present teachings may be integral with the microfluidic devices and may be activated without the need for an external actuator. Moreover, flow control mechanisms in accordance with the present teachings may include nonmechanical structures that are activated to at least partially block and/or unblock flow paths, and the flow control mechanisms also may permit passage (e.g., diffusion) of at least some gases and/or liquids therethrough. Thus, the flow control mechanisms in accordance with the present teachings may reduce wear and are relatively simple in operation. Further, in various embodiments, the flow control mechanisms may also isolate one or more portions and/or microfluidic structures of the microfluidic device from other portions and/or structures, for example, to avoid cross-contamination of various portions of the device during use.

Also, as will be explained in more detail below, in exemplary embodiments, the rate at which the flow control mechanisms are activated may be controlled so as to permit flow past a location in the microfluidic device for a time period, which may be preset, and then at least partially block the flow.

Once various structures of a microfluidic device have been filled, flow control mechanisms in accordance with various exemplary embodiments of the present teachings may achieve isolation of portions of the device from flow communication with each other. For example, in the case of a microfluidic device used for biological sample testing, the flow control mechanisms taught herein can prevent, at least for a period of time, fluid from flowing out of or into one or more sample chambers via channels that are in flow communication with the one or more sample chambers. Such isolation may be desirable, for example, before performing various processes on the sample, such as, for example, polymerase chain reaction (PCR), and to prevent cross-contamination between sample chambers and/or other sample containment portions of the device.

Also, flow control mechanisms in accordance with exemplary aspects of the present teachings may provide a mechanism for isolation and/or flow control that is relatively easily performed by a user of the biological testing device. Further, various embodiments of flow control mechanisms set forth below do not require the use of sensors, heaters, and/or other components that may be relatively difficult and costly to implement.

According to various exemplary embodiments, isolation of the various microfluidic structures (e.g., chambers) and/or controlling the flow of sample through the sample distribution network may occur through the use of flow control mechanisms that include an expandable material. Such flow control mechanisms may be formed as part of the device and may include, for example, materials that swell upon contact with a fluid, such as, for example, water, a solvent, or the like. Examples of suitable materials for this use include hydrogels, polymers (e.g., swellable polymers), such as, for example, polyacrylamide, expandable materials commonly referred to as superabsorbent" polymers (SAPs), and/or other suitable materials which are described in further detail below. The fluid used to swell the expandable material may include, for example, water or other hydrating solution, including, for example, a high pH solution or a low pH solution.

In some cases, as will be understood from the description of various exemplary embodiments herein, it may be desirable to contact the expandable materials herein with a dehydrating solution, such as, for example, alcohol, in order to contract (shrink) the expandable material. This may permit reversible flow control and/or isolation. On the other hand, in some cases, it may be desirable to prevent and/or hinder the expandable material from contracting once expanded. Thus, according to various embodiments, the expandable material may include a cross-linking agent together with polyacrylamide. The application of a stimulus, such as, for example, heat, may be used to fix the material in its expanded state and prevent and/or hinder dehydration and/or decreases in the volume of the expandable material once expanded.

The ability to reversibly and selectively actuate the flow control mechanisms in accordance with the present teachings may permit for sequential sample processing, including, for example, the ability to perform differing processes (including tests, reactions, assays, sample preparation, etc.) on the same or differing biological samples within the same substrate.

As discussed above, in some cases it may be desirable to permit reversible blocking (e.g., valving and/or sealing) of structures of a microfluidic device. For example, such reversible blocking may be desired to perform serialized reaction processes within a single microfluidic device used for biological testing and/or to perform sample preparation within such a device. In the case of serialized reaction processes, for example, it may be desirable to sequence a series of chemical reactions and/or processes within a single microfluidic device without exposing the reaction chemistries (e.g., biological sample, reagents, and other reaction-supporting substances) to the environment once they have been introduced into the microfluidic device. In the case of sample preparation and/or serialized reaction processes, therefore, it may be desirable to introduce the sample into a first sample chamber or set of sample chambers and then to isolate the first sample chamber or chambers while a reaction occurs and/or the sample mixes with another substance so as to prepare the sample for further processing (e.g., assays), etc. After the desired processing has occurred in the first sample chamber or chambers, it may then be desirable to reverse the isolation of the chambers and allow the sample to flow out of the sample chambers and to a second sample chamber or group of chambers, another region of the device, and/or a station external to the device for further processing.

Also, in some cases it may be desirable to permit passage (e.g., diffusion) of at least some gases and/or liquids through a flow control mechanism while preventing the passage of others, and/or to control the rate of passage (e.g., diffusion) of some gases and/or liquids through the flow control mechanism. In other words, using flow control mechanisms according to some exemplary embodiments may permit control over the rate of diffusion of some gases and/or liquids, thereby effectively blocking the passage of those gases and/or liquids through the flow control mechanism for at least a period of time.

With reference to FIG. 1, an exemplary embodiment of a flow control mechanism for use in controlling flow through a microfluidic structure is illustrated. FIG. 1 shows a flow control mechanism configured to control the flow of a fluid traveling through a microfluidic channel 15 in the direction indicated by the arrows. The flow control mechanism includes a chamber 100 that contains an expandable material 110, such as for example, a material configured to expand upon contact with a liquid such as water, a solvent, or the like.

Suitable expandable materials that may be used with the various embodiments disclosed herein include, but are not limited to, hyrdogels, such as, for example, polyacrylamides. In general, expandable materials useful with various exemplary embodiments disclosed herein may include water-insoluble, water-swellable absorbent polymers commonly referred as "hydrogel-forming absorbent polymers", "hydrocolloids", or "superabsorbent" polymers (SAPs), and can include polysaccharides such as carboxymethyl starch, carboxymethyl cellulose, and hydroxypropyl cellulose; nonionic types such as polyvinyl alcohol, and polyvinyl ethers; cationic types such as polyvinyl pyridine, polyvinyl morpholinione, and N,N-dimethylaminoethyl or N,N-diethylaminopropyl acrylates and methacrylates, and the respective quaternary salts thereof. Typically, SAPs useful in the present invention have a multiplicity of anionic, functional groups, such as sulfonic acid, and more typically of anionic, functional groups, such as sulfonic acid, and more typically carboxy groups. Examples of polymers suitable for use herein include those which are prepared from polymerizable, unsaturated, acid-containing monomers. Thus, such monomers include the olefinically unsaturated acids and anhydrides that contain at least one carbon to carbon olefinic double bond. More specifically, these monomers can be selected form olefinically unsaturated carboxylic acids and acid anhydrides, olefinically unsaturated sulfonic acids, and mixtures thereof.

Some non-acid monomers can also be included, usually in minor amounts, in preparing the SAPs herein. Such non-acid monomers can include, for example, the water-soluble or water-dispersible esters of the acid-containing monomers, as well as monomers that contain no carboxylic or sulfonic acid groups at all. Optional non-acid-monomers can thus include monomers containing the following types of functional groups: carboxylic acid or sulfonic acid esters, hydroxyl groups, amide-groups, amino groups, nitrile groups, quaternary ammonium salt groups, aryl groups.

Olefinically unsaturated carboxylic acid and carboxylic acid anhydride monomers include the acrylic acids typified by acrylic acid itself, methacrylic acid, ethacrylic acid, 3-chloroacrylic acid, cyanoacrylic acid, phenylacrylic acid, acryloloxypropionic acid, sorbic acid, chlorosorbic acid, angelic acid, cinnamic acid, p-chlorocinnamic acid, steryacrylic acid, itaconic acid, citroconic acid, mesaconic acid, glutaconic acid, aconitic acid, maleic acid, fumaric acid, tricarboxyethylene and maleic acid anhydride.

Olefinically unsaturated sulfonic acid monomers include aliphatic or aromatic vinyl sulfonic acids such as vinylsulfonic acid, allyl sulfonic acid, vinyl toluene sulfonic acid and styrene sulfonic acid; acrylic and methacrylic sulfonic acid such as sulfoethyl acrylate, sulfoethyl methacrylate, sulfopropyl acrylate, sulfopropyl methacrylate, 2-hydroxy-3-methacryloxypropyl sulfonic acid and 2-acrylamide-2-methylpropane sulfonic acid.

In various embodiments, SAPs for use in the present invention contain carboxy groups. These polymers include hydrolyzed starch-acrylonitrile graft copolymers, partially neutralized hydrolyzed starch-acrylonitrile graft copolymers, starch-acrylic acid graft copolymers, partially neutralized starch-acrylic acid graft copolymers, saponified vinyl acetate-acrylic ester copolymers, hydrolyzed acrylonitrile or acrylamide copolymers, slightly network crosslinked polymers of any of the foregoing copolymers, partially neutralized polyacrylic acid, and slightly network crosslinked polymers of partially neutralized polyacrylic acid.

Polymer materials for use in making the SAPs may be slightly network crosslinked polymers of partially neutralized polyacrylic acids and starch derivatives thereof. For example, the SAPs can comprise from about 50 to about 95%, for example about 75%, neutralized, slightly network crosslinked, polyacrylic acid. Network crosslinking renders the polymer substantially water-insoluble and, in part, determines the absorptive capacity and extractable polymer content characteristics of the SAPs.

SAPs also may be coated with a wicking-material such as polyethylene glycol.

The chamber 100 containing the expandable material 110 may be in flow communication with the microfluidic channel 15 via plurality of passages 120. The passages 120 may be configured such that fluid flowing through the channel 15 bypasses the passages 120 and does not enter the chamber 100 through the passages 120. The passages 120 also may be configured to permit passage of the expandable material 110 into the channel 15 as the material 110 expands from the chamber 100.

According to various exemplary embodiments, the size, shape, and number of passages 120 may be selected so as to extrude the expandable material 110 therethrough while preventing the passage of a fluid that flows through the channel 15 past the passages 120. Moreover, the size, shape, and number of passages 120 may be selected so as to control (e.g., reduce) the rate of expansion of the expandable material 110 therethrough and into the channel 15. This may permit fluid to flow through the channel 15 for a predetermined time period as the expandable material 110 expands to at least partially block the channel 15. In other words, the passages 120 may limit the rate of expansion of the expandable material 110 into the channel 15 as compared to the expandable material 110 expanding directly into the channel 15 without passing through passages 120.

Thus, in operation, the expandable material 110 may be actuated so as to expand through the passages 120 thereby entering the channel 15 to at least partially block the channel 15. Depending on the degree of expansion of the expandable material 110, the channel 15 may be completely blocked so as to prevent flow through the channel 15 past the expandable material 110 or may be partially blocked so as to slow the flow through the channel 15.

In various embodiments, the expandable material, once expanded, is permeable to small molecules. In such cases, even upon completely blocking the channel 15, the expandable material 110 may permit diffusion of some molecules, for example, after a period of time. Permeability may vary as a gradient based on molecule size. For example, smaller molecules may be able to diffuse through the expandable material at a faster rate than larger molecules. The gradient and degree of permeability may depend on the type of expandable material used. In various exemplary embodiments, the expandable material may be selected such that the diffusion rate is sufficiently slow to permit PCR and/or other biological testing to occur in the device. That is, the diffusion rate may be such that isolation of chambers occurs for a time period sufficient to permit PCR and/or other desired biological testing to occur before molecules are able to pass (e.g., diffuse) through the expandable material. Moreover, in some embodiments, the expandable material may have a selective permeability, thereby allowing at least one type of gas and/or liquid to pass therethrough while preventing at least another type.

The exemplary embodiment of FIG. 1 also depicts an exemplary arrangement of other structures in a microfluidic device and how those structures may interact with the flow control mechanism. As shown, the channel 15 may have a portion downstream of the passages 120 that is in flow communication with a chamber 20 configured to receive the fluid flowing through the channel 15. For example, the chamber 20 may receive a biological sample that flows through the channel 15 in order to conduct biological testing and/or other chemical processing or reactions while the sample is in the chamber 20. The chamber 20 also may have an outlet 25 that leads to a return channel 30 in flow communication with the chamber 100.

In this way, fluid exiting the chamber 20 may flow through the return channel 30, into the chamber 100, and into contact with the expandable material 110. Thus, if a continuous flow of fluid is supplied to channel 15, the fluid flows through channel 15 past the passages 120 and into the chamber 20. After filling the chamber 20, the fluid exits at outlet 25 into the return channel 30 and into contact with the expandable material 110 in the chamber 100. Upon contact with the expandable material 110, the expandable material 110 may expand and pass (e.g., be extruded) through the passages 120 and into the channel 15 to at least partially block the channel 15 and hinder the flow of fluid through the channel 15 past the expandable material 110 in the channel 15. The exemplary embodiment of FIG. 1 therefore permits the fluid that is being distributed in the microfluidic device (of which the channels and chambers shown in FIG. 1 may be a part), for example, a biological sample for biological testing in a sample chamber 20, to be used as the mechanism for expanding the expandable material 110 and actuating the flow control mechanism. The configuration (e.g., cross-section and length) of the channel 30 may be selected so as to control the time period between the fluid filling the chamber 20 and the expansion of the expandable material 110 into the channel 15.

According to various embodiments, the channel 30 may move the fluid therethrough to the chamber 100 via capillary action. In various embodiments, the channel 30 may have a volume ranging from about volumes 1 microliter to about 500 microliters, depending on the application. The overall length of the channel 30 also may be selected depending upon the desired application and time between the fluid entering the channel 30 and reaching the chamber 100. The chamber 100 can be sized so as to contain an amount of expandable material in proportion to the channel. In an exemplary aspect, the volume of the chamber 100 may be about 1 to 10 times the volume of the segment of channel 15 that the chamber is adjacent to.

Figure 2:
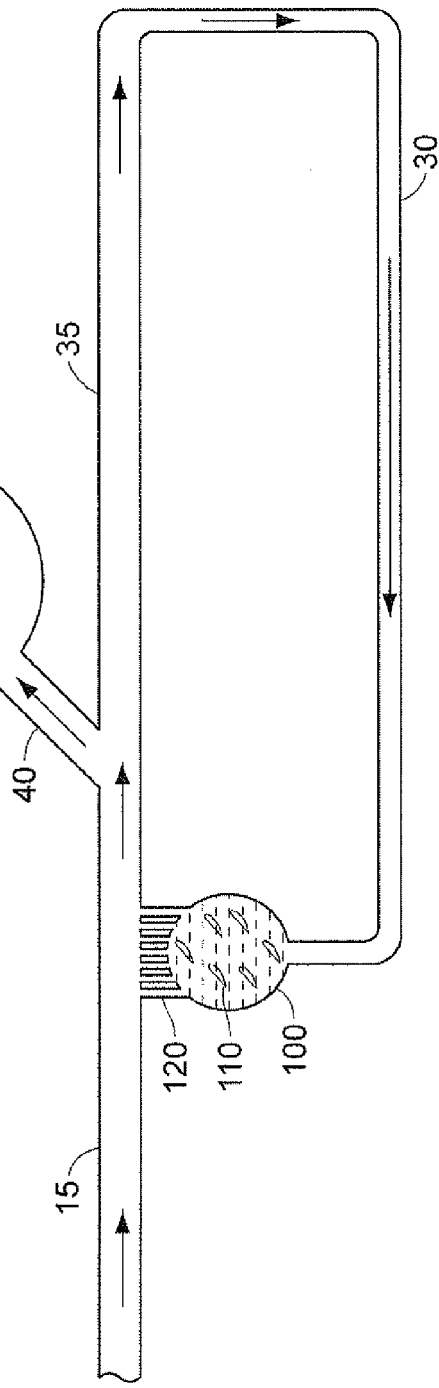
FIG. 2 is a plan view of a flow control mechanism in a microfluidic device according to another exemplary embodiment of the present teachings.

In another exemplary arrangement shown in FIG. 2, in lieu of the chamber 20, the channel 15 may be connected to additional channel length or another channel 35 at its downstream end past the passages 120. The additional channel length or another channel may connect to the return channel 30. In such an arrangement, the sample chamber 20 may be arranged to receive fluid sample from the channel 15 but not to supply fluid to the chamber 100. For example, as depicted in FIG. 2, the sample chamber 20 may be in flow communication with the channel 15 via a branch channel 40. Moreover, although only one sample chamber 20 is depicted in FIGS. 1 and 2, those of ordinary skill in the art would understand that microfluidic devices utilizing the flow control mechanisms discussed herein may have a plurality of interconnected channels and chambers arranged in series, parallel, or a combination thereof. Those having skill in the art also would understand that a variety of configurations may be used to supply the fluid that fills one or more chambers of a microfluidic device for biological testing to the chamber to expand the expandable material.

It is envisioned that a separate fluid flow network also may be employed to flow a fluid, for example, other than the biological sample flowing through the channel 15 and other portions of a microfluidic device, into the chamber 100 and into contact with the expandable material 110. Those having ordinary skill in the art would understand how to configure and arrange such a separate fluid flow network to control the actuation of the expandable material 110 in the chamber 100 and the expansion of the expandable material 110 into the channel 15. For example, an input port separate from an input used for introducing biological sample into the microfluidic device may be used to introduce another fluid, for example, water, into a channel that is in flow communication with the chamber 100 holding the expandable material 110. In various exemplary embodiments, the channel in flow communication with the input port may be isolated from other channels, chambers and the like forming the biological sample fluid flow network of the microfluidic device.

Figure 3:
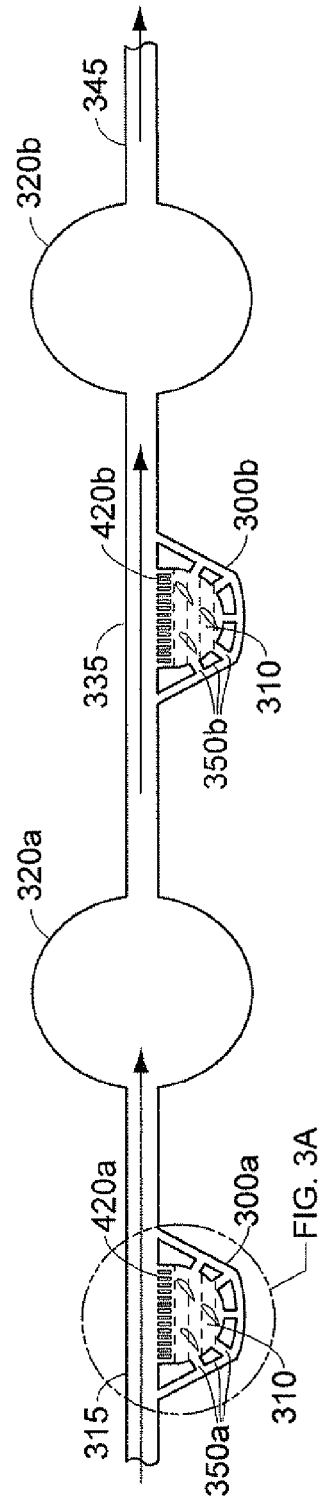
FIG. 3 is a plan view of a flow control mechanism in a microfluidic device according to yet another exemplary embodiment of the present teachings.

FIG. 3 depicts yet another exemplary embodiment of flow control mechanisms for use in controlling fluid flow through microfluidic structures of a microfluidic device. The exemplary embodiment of FIG. 3 shows a plurality of chambers 320a and 320b in flow communication with each other and connected in series via a channel 335. The channel 335 serves as an outlet channel to the upstream chamber 320a and as an inlet channel to the downstream chamber 320b in FIG. 3. The direction of the arrows in FIG. 3 indicates the upstream and downstream directions. The upstream chamber 320a also is in flow communication with an inlet channel 315 for introducing fluid to the chamber 320a. The downstream chamber 320b is in flow communication with an outlet channel 345 for receiving fluid exiting from the chamber 320b. Although only two sample chambers 320 are depicted in FIG. 3, those having skill in the art would understand that any number of sample chambers 320 may be connected in series, with the outlet channel of an upstream chamber serving as the inlet channel to an adjacent downstream chamber.

Figure 3A:
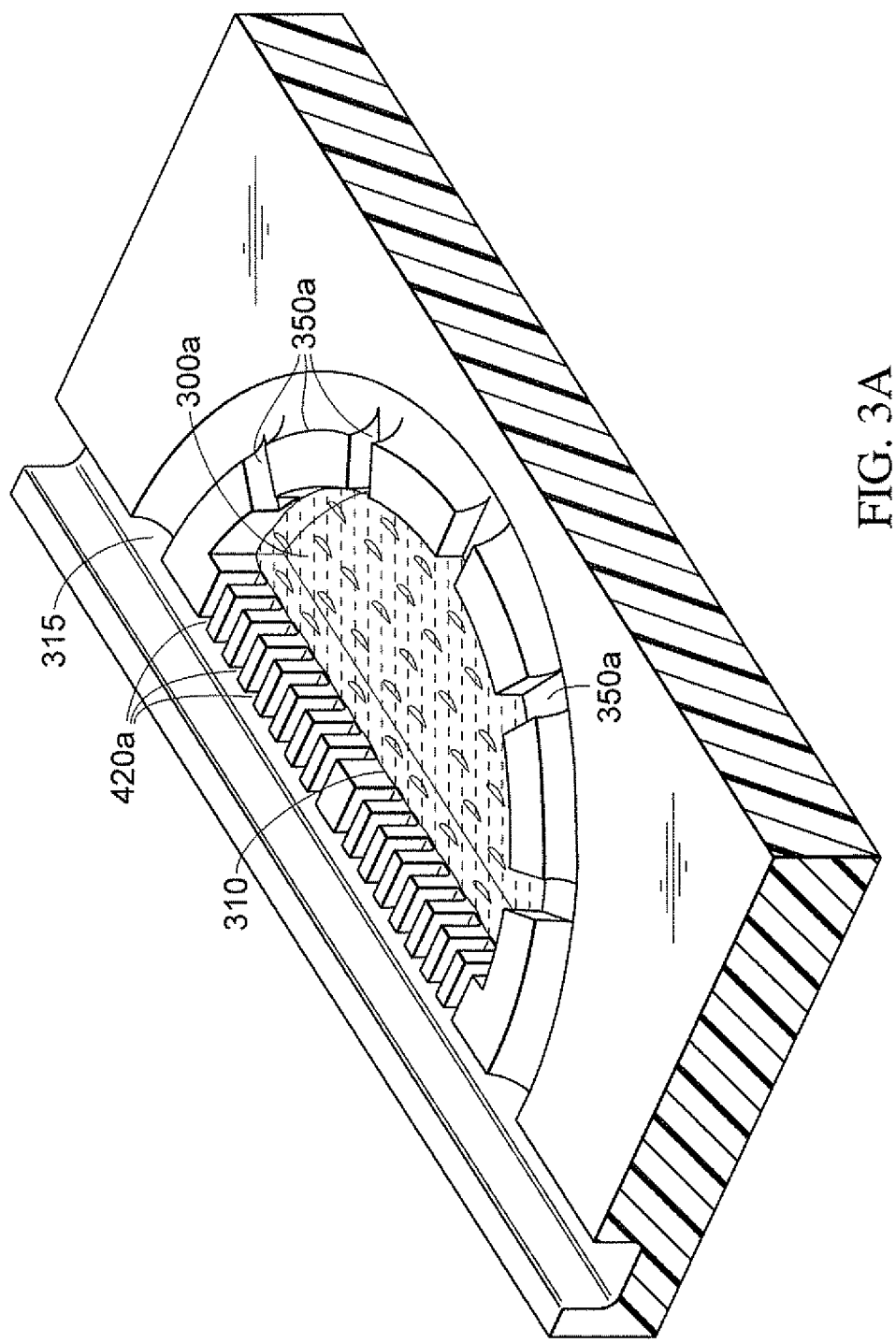
FIG. 3A is a partial perspective view of the portion 3A of FIG. 3.

Disposed upstream of each sample chamber 320a and 320b are chambers 300a and 300b each containing an expandable material 310. The expandable material 310 may be of the same type and have the same properties as those described above with reference to the embodiment of FIG. 1. The chambers 300a and 300b are in respective flow communication with channels 315 and 335 via channel networks 350a and 350b. FIG. 3A depicts a perspective view of a portion of channel 315 and the chamber 300a, channel network 350a, and passages 420a. The chamber 300b, channel network 350b and passages 420b may have a similar structure. The channel networks 350a and 350b may be in the form of a series of linked fluid passages (e.g., channels) that are configured to draw fluid flowing through the channels 315 and 335 into the chambers 300a and 300b, respectively. In particular, the networks 350a and 350b may be capillary networks that draw fluid into the chambers 300a and 300b via capillary action and direct the fluid into the chambers 300a and 300b at a back side of the chambers 300a and 300b (e.g., the portion of the chambers 300a and 300b that is substantially opposite to and facing the channels 315 and 335, respectively, as shown in FIG. 3A). Additionally, the chambers 300a and 300b are in respective flow communication with the channels 315 and 335 via a plurality of passages 420a and 420b. However, fluid flowing through the channels 315 and 335 bypasses the passages 420a and 420b and flows into the chambers 300a and 300b via the networks 350a and 350b.

The networks 350a and 350b can be configured to allow the passage of fluid, such as, for example, a biological sample fluid, flowing through channels 315 and 335 into the chambers 320a and 320b at a controlled rate. The passages 420a and 420b can be configured so as to permit the expandable material 310 to pass therethrough and into channels 315 and 335, respectively, during expansion. Further, similar to passages 120 discussed above with reference to FIGS. 1 and 2, the passages 420a and 420b also may be configured to prevent the fluid flowing in the channels 315 and 335 from passing through the passages 420a and 420b into the chambers 300a and 300b. In various exemplary embodiments, the passages 420a and 420b may be in the form of a grating configured to extrude the expandable material 310 therethrough, for example, to control (e.g., reduce) the rate at which the expandable material 310 expands out of the chambers 320a and 320b and into the channels 315 and 335.

In the exemplary embodiment of FIG. 3, therefore, fluid such as a biological sample, for example, may be introduced into the channel 315 to flow in the direction of the arrows indicated in the figure. Upon passing the chamber 300a, the fluid may be introduced into the channel network 350a (e.g., capillary network) while bypassing the passages 420a. The fluid may then fill the chamber 320a and from there flow through the channel 335. As the fluid flows past the chamber 300b, it enters the channel network 350b and bypasses the passages 420b. The networks 350a and 350b may be configured to control the time it takes for the fluid to travel through the networks 350a and 350b and into the chambers 300a and 300b to contact and expand the expandable material 310. For example, the networks 350a and 350b may flow the fluid via capillary action. Thus, there may be a delay between the time the fluid enters the networks 350a and 350b and the time the fluid reaches the chambers 300a and 300b. The configuration of the networks 350a and 350b may be selected so as to control the delay period as desired. In other words, the delay may be a predetermined delay based on the configuration of the networks 350a and 350b, which may or may not be the same. By way of example, the delay may be selected so as to allow the fluid to fill each of the sample chambers 320a and 320b, for example, before entering the chambers 300a and 300b to expand the expandable material 310. In this manner, the expandable material 310 can expand and enter the channels 315 and 335 after the chambers 320a and 320b are filled.

In various exemplary embodiments, the expandable material 310 may expand to substantially and/or completely block the channels 315 and 335 so as to isolate the chambers 320a and 320b in order to perform biological testing of the fluid in the chambers 320a and 320b. If such isolation is desired, an additional flow control mechanism may be provided in conjunction with channel 345 downstream of chamber 320b. As described above with reference to FIG. 1, the expandable material 310 also may permit the passage of at least some gases and/or liquids therethrough, for example, via diffusion. The expandable material 310 may have a permeability gradient that controls the rate at which various molecules may pass (e.g., diffuse) through the expandable material. In some cases, the expandable material 310 may permit passage of some types of gases and/or liquids while preventing the passage of other types of gases and/or liquids.

According to various exemplary aspects, the flow control mechanisms, for example in the embodiment of FIG. 3, may be actuated in a serialized manner to control the flow of fluid through the channels 315, 335, and 345 and the chambers 320a and 320b. Moreover, in some embodiments, it may be desirable to fill the upstream chamber 320a with fluid and then isolate that chamber by activating the flow control mechanisms upstream and downstream of the chamber 320a so that biological testing can occur in the chamber 320a. After a predetermined time (e.g., after testing is complete), the flow control mechanism associated with the chamber 300b may be reversed such that the expandable material 310 contracts, thereby permitting fluid to travel in the channel 335 past the chamber 300b and into the chamber 320b for further biological testing to occur in chamber 320b.

The passages 420a and 420b also may be configured so as to control the rate of expansion of the expandable material 310 into channels 315 and 335, respectively. Thus, the passages 420a and 420b may also serve to control the time delay between the fluid flowing through the channels 315 and 335 past the chambers 300a and 300b and the expansion of the expandable material 310 out of the chambers 300a and 300b and into the channels 315 and 335. In this manner, the time delay before the actuation of the flow control mechanisms to at least partially block the flow in the channels 315 or 335 may be controlled by controlling the configuration of the capillary networks 350a and 350b and/or the passages 420a and 420b.

In various exemplary embodiments, channels may have cross-sectional dimensions ranging from about 10 microns by 100 microns to about 0.5 mm by 5 mm. However, it would be understood by those having skill in the art that the various sizes of the microfluidic structures may vary depending on the application for which the devices are used, and the sizes of respective microfluidic structures may be scaled accordingly.

In various exemplary embodiments, the expandable material used to control fluid flow in accordance with the present teachings may be a material that is configured to expand upon the influence of a variety of external factors other than or in conjunction with contact with a liquid. By way of example only, the expandable material may be configured to expand upon changes in temperature, pH, light, concentration of a particular material placed in contact with the expandable material, ion concentration, electrical stimuli, and/or combinations thereof. Further, in various embodiments, the expandable material may have a continuous or a discontinuous form, such as, for example, a plurality of particles. Expansion of the expandable material also may be reversible, such that upon deactivation (e.g., dehydration and/or contact with a solvent), the expandable material may contract from its expanded size and shape, for example, returning to its size and shape prior to expansion.

The cross-link density of the expandable material, such as, polyacrylamide, for example, may interact with the function of the flow control mechanism and the surface area of the fluid flow path. For example, a highly cross-linked polymer may not swell as much as a polymer that has less cross-linking. A polymer that is highly cross-linked also may not need as much surface area to press against to function properly (e.g., perform isolation and/or sealing). In contrast, a polymer that is less cross-linked may require much more surface area to press against to perform adequate sealing. A low level of cross-linking may permit the expandable polymer material to swell to a much higher degree. It is envisioned that a range of cross-link densities and consequently a range of passages configurations, sizes, and arrangements may be selected depending on the particular application and desired function. Those having skill in the art would understand how to choose an appropriate passage configurations (e.g., number, shape, and size) based on the desired application and/or factors including, for example, the expandable material, the amount (e.g., volume) of expandable material, the volume of the chamber containing the expandable material, the degree of cross-linking of the expandable material, the desired rate of expansion of the expandable material into the flow path, and other factors.

Exemplary embodiments of the disclosure provide a microfluidic device configured to be loaded with a fluid, such as, for example, a biological sample for biological and/or chemical testing or processing. According to various exemplary embodiments, the present invention may provide a device useful for testing or processing one or more fluid samples for the presence, absence, and/or amount of one or more selected analytes. The sample may be a biological sample, for example, an aqueous biological sample, an aqueous solution, a slurry, a gel, a blood sample, a polymerase chain reaction (PCR) master mix, or any other type of sample.

According to various embodiments, a microfluidic device may include a substrate or body structure that has one or more microscale sample-support, manipulation, and/or analysis structures, such as one or more channels, wells, chambers, reservoirs, valves or the like disposed within it. As used herein, "microscale" or "micro" may describe a fluid channel, well, conduit, chamber, reservoir, or other structure configured to flow and/or contain a fluid that has at least one cross-sectional dimension, e.g., width, depth or diameter, of less than about 1000 micrometers. In various embodiments, such structures have at least one cross-sectional dimension of no greater than about 1 millimeter, and in some embodiments, from about 1 micrometer to about 500 micrometers (e.g., from about 5 micrometers to about 250 micrometers, or from about 5 micrometers to about 100 micrometers). In one embodiment, the at least one cross-sectional dimension may range from about 50 micrometers to about 150 micrometers.

With respect to chambers, for example, as may be found in a microfluidic card (microcard), chip (microchip), or tray (microtray) used in biological testing, "microscale" or "micro" as used herein, may describe structures configured to hold a small (e.g., micro) volume of fluid, e.g., no greater than about a few microliters. By way of example, the microchambers configured to hold a sample to perform an assay thereon may have a volume of about 1.35 µl. In various embodiments, such chambers are configured to hold no more than 100 µl, no more than 75 µl, no more than 50 µl, no more than 25 µl, no more than 10 µl, or no more than 1 µl. In some embodiments, such chambers can be configured to hold, for example, from about 0.0001 µl to about 20 µl.

Although in exemplary aspects, it is envisioned that the present teachings may be suited to microfluidic devices having volumes in accordance with the various ranges discussed above, such volumes and sizes are exemplary only. Indeed, it is envisioned that the present teachings of flow control mechanisms and principles of operation of controlling fluid flow within a device according to various embodiments may apply to devices of other configurations and sizes, and including volumes for flowing and/or containing fluid ranging from picoliters to several liters. Moreover, the present teachings of flow control mechanisms and methods have applications other than in the field of biological testing and thus may be applied in a variety of other fields, including, but not limited to, inkjet technology and other industrial process and control equipment in which microfluidic principles apply.

A microfluidic device may be configured in any of a variety of shapes and sizes. In various embodiments, a microfluidic device can be generally rectangular, having a width dimension of no greater than about 15 cm (e.g., about 2, 6, 8 or 10 cm), and a length dimension of no greater than about 30 cm (e.g., about 3, 5, 10, 15 or 20 cm). In other embodiments, a microfluidic device can be generally rectangular shaped. In still further embodiments, the microfluidic device can be generally circular (i.e., disc-shaped), having a diameter of no greater than about 35 cm (e.g., about 7.5, 11.5, or 30.5 cm). The disc can have a central hole formed therein, e.g., to receive a spindle (having a diameter, e.g., of about 1.5 or 2.2 cm). Other shapes and dimensions are contemplated herein, as well. In yet other embodiments, the microfluidic device may be in the form of a deformable tube.

The present teachings are well suited for microfluidic devices which typically include a system or device having channels, chambers, and/or reservoirs (e.g., a network of chambers connected by channels) for supporting or accommodating very small (micro) volumes of fluids, and in which the channels, chambers, and/or reservoirs have microscale dimensions.

The various sample-containment structures provided within a microfluidic device as set forth herein can take any shape including, but not limited to, a tube, a channel, a microfluidic channel, a vial, a cuvette, a capillary, a cube, an etched channel plate, a molded channel plate, an embossed channel plate, or other chamber. Such features can be part of a combination of multiple such structures grouped into a row, an array, an assembly, etc. Multi-chamber arrays within a microfluidic device can include 12, 24, 36, 48, 96, 192, 384, 768, 1536, 3072, 6144, 12,288, 24,576, or more, sample chambers, for example.

In various exemplary aspects, a microfluidic device in accordance with the present teachings may include a substrate defining a sample-distribution network having a main fluid channel for supplying the sample throughout the device, one or more sample chambers (preferably a plurality of such chambers), one or more inlet branch channels providing flow communication between each of the one or more chambers and the main fluid channel, and one or more outlet branch channels in flow communication with the one or more sample chambers. In other embodiments, the sample chambers may be connected in series such that an outlet branch of one sample chamber serves as an inlet branch to another sample chamber. In yet further embodiments, a substrate may include both sample chambers arranged in series and in parallel.

In various exemplary embodiments, the one or more sample chambers may be configured to receive an analyte-specific reagent effective to react with a selected analyte that may be present in a sample that fills the sample chamber. For example, fluorescent probes for amplification of specific nucleic acid targets may be used.

According to various embodiments, the substrate may also have, for each chamber, an optically transparent window through which analyte-specific reaction products can be detected, for example via fluorescence detection mechanisms. The detection mechanism may comprise a non-optical sensor for signal detection.

It is contemplated that a variety of techniques may be used to fill the sample chambers and other sample-containment portions of the devices, according to various aspects. For example, filling the various sample-containment portions of the device may occur via centrifuging (e.g., spinning) the device to cause the sample or other liquid to move from, for example, fluid channels into sample chambers. Vacuum also may be used to cause the fluid in the device to move to and/or through various sample-containment portions. According to another exemplary aspect, positive pressure, applied, for example, via a syringe, pump, or compressor placed in flow communication with a sample-containment structure (e.g., a fluid inlet leading to a main fluid channel) of the device may be used to cause fluid to move throughout the network of sample containment structures in the device to desired portions of the device. In yet another exemplary aspect, capillary forces may be used to move the liquid to desired sample-containment structures of the device. Those having skill in the art would understand how to implement the various techniques discussed above to fill microfluidic devices. In each of the above configurations, venting channels and vents can be used to accommodate any displaced venting gas, whether air or other gas such as nitrogen that is pushed out by the sample, or the venting channels and vents can be used to evacuate the gas in the sample chambers to create a vacuum for the sample or aspirate sample itself.

The term "sample chamber" as used herein can refer to any structure that provides containment to a sample, for example, for performing chemical reactions, testing, analysis, mixing (including, e.g., preparation) or other processing of the sample. The chamber can have any shape including circular, rectangular, cylindrical, etc. Multi-chamber arrays can include 12, 24, 36, 48, 96, 192, 384, 3072, 6144, or more sample chambers. The term "channel" as used herein can refer to any structure that may be used to flow sample, for example, to or from a chamber. A channel can have any shape. It can be straight or curved, as necessary, with cross-sections that are shallow, deep, square, rectangular, concave, or V-shaped, or any other appropriate configuration.

The term "biological sample" as used herein can refer to any biological or chemical substance, typically in an aqueous solution with luminescent dye that can produce emission light in relation to one or more nucleic acids present in the solution. The biological sample can include one or more nucleic acid sequences to be incorporated as a reactant in polymerase chain reaction (PCR) and other reactions such as, for example, ligase chain reactions, antibody binding reactions, oligonucleotide ligations assays, and hybridization assays. The biological sample can include one or more nucleic acid sequences to be identified for DNA sequencing.

In various embodiments, the channels (e.g., inlet and/or outlet channels) in flow communication with a sample chamber can be dimensioned to facilitate relatively rapid delivery of sample to the sample chambers, while occupying as little volume as possible. For example, cross-sectional dimensions for the channels can range from 0.5 μm to 250 μm for both the width and depth. In some embodiments, the channel path lengths to the sample chambers can be minimized to reduce the total channel volume. For example, the network can be substantially planar, i.e., the sample introduction channels and sample chambers in the substrate may intersect in a common plane.

In various embodiments, the substrate that defines the sample-distribution network can be constructed from any solid material that is suitable for conducting analyte detection, such as, for example, optical fluorescent-based detection. Materials that can be used will include various plastic polymers and copolymers, such as polypropylenes, polyethylenes, polyurethanes, polystyrenes, polyimides, COP, COC, and polycarbonates. Inorganic materials such as glass and silicon are also useful. Silicon, in view of its high thermal conductivity, may facilitate rapid heating and cooling of the substrate if necessary. The substrate can be formed from a single material or from a plurality of materials.

In various embodiments, the sample-distribution network including cavities and trenches formed in a base portion of the substrate can be formed by any suitable method known in the art. Injection molding can be suitable to form sample cavities and connecting channels having a desired pattern, Standard etching, RIE, DRIE, and wet-etching techniques from the semiconductor industry can be used as known in the art of photo-lithography.

In various embodiments, the substrate forming a microfluidic device can be prepared from two or more laminated layers that may be made from, for example, a detection-compatible material. The term detection-compatible material may refer to the optical detection with a substrate that includes one or more layers which provide optical transparency for each sample chamber, through which a luminescent dye can be detected, for example. For this purpose, silica-based glasses, quartz, polycarbonate, or an optically transparent plastic layer may be used, for example. Selection of the particular detection-compatible material depends in part on the optical properties of the material. For example, in luminescent dye-based assays, the material may exhibit low fluorescence emission at the wavelength(s) being measured. The detection-compatible material also may exhibit minimal light absorption for the signal wavelengths of interest.

In various embodiments, other layers in the substrate can be formed using the same or different materials. Such materials may be assay compatible so as to provide compatibility with the interaction of assay reagents and assay conditions (heat, pressure, pH, etc.) with the substrate material (hydrophobic, hydrophilic, inert, etc.). For example, the layer or layers, such as a film or membrane layer defining the sample chambers can be formed predominantly from a material that has high heat conductivity, such as silicon or a heat-conducting metal. The silicon surfaces that contact the sample can be coated with an oxidation layer or other suitable coating, to render the surface more inert and make it an assay-compatible material. Similarly, where a heat-conducting metal is used in the substrate, the metal can be coated with an assay-compatible material, such as a plastic polymer, to prevent corrosion of the metal and to separate the metal surface from contact with the sample. The suitability of a particular surface may be verified for the selected assay as known by the conditions and reagents used in the assay.

According to various embodiments, a membrane layer used to at least partially define a sample containment portion of a microfluidic device may be deformable and/or preformed. Suitable deformable membrane materials may include, for example, elastomers that are compatible with the chemistries (e.g. biological samples and/or assays) contained in the microfluidic device, including, but not limited to, polydimethylsiloxanes (PDMS) or polyurethanes. Examples of suitable preformed membrane materials, include, but are not limited to, for example polypropylene, and the expanded shape of the membrane may be molded into the film material before assembly.

In various embodiments, the substrate layers can be sealably bonded in a number of ways. A suitable bonding substance, such as a glue or epoxy-type resin, can be applied to one or both opposing surfaces that will be bonded together. The bonding substance may be applied to the entirety of either surface, so that the bonding substance (after curing) can come into contact with the sample chambers and the distribution network. In this case, the bonding substance is selected to be compatible with the sample and detection reagents used in the assay. Alternatively, the bonding substance can be applied around the distribution network and detection chambers so that contact with the sample can be minimal or avoided entirely. The bonding substance may also be provided as part of an adhesive-backed tape or membrane, which is then brought into contact with the opposing surface. In yet another approach, the sealable bonding is accomplished using an adhesive gasket layer, which is placed between the two substrate layers. In any of these approaches, bonding may be accomplished by any suitable method, including pressure-sealing, ultrasonic welding, and heat curing, for example.

In various embodiments, a pressure-sensitive adhesive (PSA) can be used in constructing the microfluidic device, for example, the membrane layer. PSA films which can be applied to a surface and adhered to that surface are obtained by applying pressure to the film. Normally pressure is applied throughout the whole film, so that the whole film can adhere to the surface. PSA films can have a threshold pressure, which may be relatively low, in order to activate the adhesion. By applying pressure to some selected regions, the bonding can be limited to those regions only, thus allowing for obtaining a bonding pattern. In this way, channels and chambers can be defined. The elastic properties of the film can then be used to pressure-drive a fluid through the unbonded regions, since the film would deform under the liquid pressure, thus opening up a channel. PSA films can have hydrophobic and hydrophilic areas on the same film to provide areas of differing wetting characteristics, properly patterned, to provide, for example fluid flow in sample introduction channels and gas venting in venting channels. In various embodiments, PSA films that are hydrophilic can have the hydrophilic properties deteriorate in a matter of days. The lack of stability (hydrophilic film turning into hydrophobic) can provide controllable, irreversible or reversible, changes (upon temperature change, heat addition, UV exposure, or just time delay after curing) in the wetting nature of the film. In various embodiments, PSA films can have different porosities and permeabilities to a gas. A highly permeable PSA film can be more advantageous than a low-permeability one for instance to vent the sample chambers. Further, a PSA film whose permeability/porosity can be modified in a reversible fashion with temperature change, and/or in an irreversible fashion by heat addition or UV exposure. In various embodiments, PSA films can have hydrophilic properties, provide solvent resistance, maintain the adhesion characteristics at a high temperature (95-100 degree Celsius), and can be optically clear with low auto-fluorescence. In various embodiments, PSA films can be thermally expandable to swell at desired locations and close off channels.

Other techniques that may be suitable for bonding the PSA films include, but are not limited to, for example, direct write laser welding, flood illumination laser welding, and heat stamping with a mold form to seal the microfluidic structures as desired.

In various embodiments, microfluidic devices including substrates, in accordance with exemplary embodiments of the present teaching can be adapted to allow rapid heating and cooling of the sample chambers to facilitate reaction of the sample with the analyte-detection reagents, including luminescent dyes. In one embodiment, the device can be heated or cooled using an external temperature-controller. The temperature-controller may be adapted to heat/cool one or more surfaces of the device, or can be adapted to selectively heat the sample chambers themselves. To facilitate heating or cooling with this embodiment, the substrate can be formed of a material that has high thermal conductivity, such as copper, aluminum, or silicon. Alternatively, the substrate base can be formed from a material having moderate or low thermal conductivity, while the membrane layer can be formed from a conductive material such that the temperature of the sample chambers can be conveniently controlled by heating or cooling the substrate through the film, regardless of the thermal conductivity of the base. For example, the membrane layer can be formed of an adhesive copper-backed tape.

In various embodiments, sample chambers and/or other sample-containment portions can be pre-loaded with detection reagents that are specific for the selected analytes of interest. For example, the sample chambers may contain a dried reagent. The detection reagents can be designed to produce an optically detectable signal via any of the optical methods known in the field of detection. It will be appreciated that although the reagents in each sample chamber can contain substances specific for the analyte(s) to be detected in the particular chamber, other reagents for production of the optical signal for detection can be added to the sample prior to loading, or may be placed at locations elsewhere in the network for mixing with the sample. Whether particular assay components are included in the detection chambers or elsewhere will depend on the nature of the particular assay, and on whether a given component is stable to drying. Pre-loaded reagents added in the detection chambers during manufacture of the substrate can enhance assay uniformity and minimize the assay steps conducted by the end-user.

In various embodiments, the analyte to be detected may be any substance whose presence, absence, or amount is desirable to be determined. The detection means can include any reagent or combination of reagents suitable to detect or measure the analyte(s) of interest. It will be appreciated that more than one analyte can be tested for in a single detection chamber, if desired.

In various exemplary embodiments, the analytes are selected-sequence polynucleotides, such as DNA or RNA, and the analyte-specific reagents include sequence-selective reagents for detecting the polynucleotides. The sequence-selective reagents include at least one binding polymer that is effective to selectively bind to a target polynucleotide having a defined sequence. The binding polymer can be a conventional polynucleotide, such as DNA or RNA, or any suitable analog thereof, which has the requisite sequence selectivity. Other examples of binding polymers known generally as peptide nucleic acids may also be used. The binding polymers can be designed for sequence specific binding to a single-stranded target molecule through Watson-Crick base pairing, or sequence-specific binding to a double-stranded target polynucleotide through Hoogstein binding sites in the major groove of duplex nucleic acid. A variety of other suitable polynucleotide analogs are also known in the art of nucleic acid amplification. The binding polymers for detecting polynucleotides are typically 10-30 nucleotides in length, with the exact length depending on the requirements of the assay, although longer or shorter lengths are also contemplated.

In various embodiments, the analyte-specific reagents include an oligonucleotide primer pair suitable for amplifying, by polymerase chain reaction, a target polynucleotide region of the selected analyte that is flanked by 3'-sequences complementary to the primer pair. In practicing this embodiment, the primer pair is reacted with the target polynucleotide under hybridization conditions which favor annealing of the primers to complementary regions of opposite strands in the target. The reaction mixture is then thermal cycled through several, and typically about 20-40, rounds of primer extension, denaturation, and primer/target sequence annealing, according to well-known polymerase chain reaction (PCR) methods. Typically, both primers for each primer pair are pre-loaded in each of the respective sample chambers, along with the standard nucleotide triphosphates, or analogs thereof, for primer extension (e.g., ATP, CTP, GTP, and TTP), and any other appropriate reagents, such as MgCl2 or MnCl2. A thermally stable DNA polymerase, such as Taq, Vent, or the like, may also be pre-loaded in the chambers, or may be mixed with the sample prior to sample loading. Other reagents may be included in the detection chambers or elsewhere as appropriate. Alternatively, the detection chambers may be loaded with one primer from each primer pair, and the other primer (e.g., a primer common to all sample chambers) can be provided in the sample or elsewhere. If the target polynucleotides are single-stranded, such as single-stranded DNA or RNA, the sample is preferably pre-treated with a DNA- or RNA-polymerase prior to sample loading, to form double-stranded polynucleotides for subsequent amplification. This pre-treatment can be provided in the cartridge.

In yet other embodiments, the presence and/or amount of target polynucleotide in a sample chamber, as indicated by successful amplification, is detected by any suitable means. For example, amplified sequences can be detected in double-stranded form by including an intercalating or crosslinking dye, such as ethidium bromide, acridine orange, or an oxazole derivative, for example, which exhibits a fluorescence increase or decrease upon binding to double-stranded nucleic acids. The level of amplification can also be measured by fluorescence detection using a fluorescently labeled oligonucleotide. In this embodiment, the detection reagents include a sequence-selective primer pair as in the more general PCR method above, and in addition, a sequence-selective oligonucleotide (FQ-oligo) containing a fluorescer-quencher pair. The primers in the primer pair are complementary to 3' regions in opposing strands of the target analyte segment which flank the region which is to be amplified. The FQ-oligo is selected to be capable of hybridizing selectively to the analyte segment in a region downstream of one of the primers and is located within the region to be amplified. The fluorescer-quencher pair can include a fluorescer dye and a quencher dye which are spaced from each other on the oligonucleotide so that the quencher dye is able to significantly quench light emitted by the fluorescer S at a selected wavelength, while the quencher and fluorescer are both bound to the oligonucleotide. The FQ-oligo preferably includes a 3'-phosphate or other blocking group to prevent terminal extension of the 3' end of the oligo. The fluorescer and quencher dyes may be selected from any dye combination having the proper overlap of emission (for the fluorescer) and absorptive (for the quencher) wavelengths while also permitting enzymatic cleavage of the FQ-oligo by the polymerase when the oligo is hybridized to the target. Suitable dyes, such as rhodamine and fluorscein derivatives, and methods of attaching them, are well known in the art of nucleic acid amplification.

In another embodiment, the detection reagents include first and second oligonucleotides effective to bind selectively to adjacent, contiguous regions of a target sequence in the selected analyte, and which can be ligated covalently by a ligase enzyme or by chemical means as known in the art of oligonucleotide ligation assay, (OLA). In this approach, the two oligonucleotides (oligos) can be reacted with the target polynucleotide under conditions effective to ensure specific hybridization of the oligonucleotides to their target sequences. When the oligonucleotides have base-paired with their target sequences, such that confronting end subunits in the oligos are base-paired with immediately contiguous bases in the target, the two oligos can be joined by ligation, e.g., by treatment with ligase. After the ligation step, the sample chambers may be heated to dissociate unligated probes, and the presence of ligated, target-bound probe is detected by reaction with an intercalating dye or by other means. The oligos for OLA may also be designed so as to bring together a fluorescer-quencher pair, as discussed above, leading to a decrease in a fluorescence signal when the analyte sequence is present. In the above OLA ligation method, the concentration of a target region from an analyte polynucleotide can be increased, if necessary, by amplification with repeated hybridization and ligation steps. Simple additive amplification can be achieved using the analyte polynucleotide as a target and repeating denaturation, annealing, and ligation steps until a desired concentration of the ligated product is achieved.

In another embodiment, the ligated product formed by hybridization and ligation can be amplified by ligase chain reaction (LCR). In this approach, two sets of sequence-specific oligos are employed for each target region of a double-stranded nucleic acid. One probe set includes first and second oligonucleotides designed for sequence-specific binding to adjacent, contiguous regions of a target sequence in a first strand in the target. The second pair of oligonucleotides is effective to bind (hybridize) to adjacent, contiguous regions of the target sequence on the opposite strand in the target. With continued cycles of denaturation, reannealing and ligation in the presence of the two complementary oligo sets, the target sequence is amplified exponentially, allowing small amounts of target to be detected and/or amplified.

In various embodiments, it will be appreciated that since the selected analytes in the sample can be tested for under substantially uniform temperature and pressure conditions, it may be desirable that the detection reagents in the various sample chambers have substantially the same reaction kinetics. This can be accomplished using oligonucleotides and primers having similar or identical melting curves, which can be determined by empirical or experimental methods as are known in the art. In another embodiment, the analyte is an antigen, and the analyte-specific reagents in each detection chamber include an antibody specific for a selected analyte-antigen. Detection may be by fluorescence detection, agglutination, or other homogeneous assay format. As used herein, "antibody" is intended to refer to a monoclonal or polyclonal antibody, an Fc portion of an antibody, or any other kind of binding partner having an equivalent function. For fluorescence detection, the antibody may be labeled with a fluorescer compound such that specific binding of the antibody to the analyte is effective to produce a detectable increase or decrease in the compound's fluorescence, to produce a detectable signal (non-competitive format). In an alternative embodiment (competitive format), the detection means includes (i) an unlabeled, analyte-specific antibody, and (ii) a fluorescer-labeled ligand which is effective to compete with the analyte for specifically binding to the antibody. Binding of the ligand to the antibody is effective to increase or decrease the fluorescence signal of the attached fluorescer. Accordingly, the measured signal can depend on the amount of ligand that is displaced by analyte from the sample. In a related embodiment when the analyte is an antibody, the analyte-specific detection reagents include an antigen for reacting with a selected analyte antibody which may be present in the sample. The reagents can be adapted for a competitive or non-competitive type format, analogous to the formats discussed above. Alternatively, the analyte-specific reagents can include a mono- or polyvalent antigen having one or more copies of an epitope which is specifically bound by the antibody-analyte, to promote an agglutination reaction which provides the detection signal.

In various embodiments, the selected analytes can be enzymes, and the detection reagents include enzyme substrate molecules which are designed to react with specific analyte enzymes in the sample, based on the substrate specificities of the enzymes. Accordingly, sample chambers in the device may each contain a different substrate or substrate combination, for which the analyte enzyme(s) may be specific. This embodiment is useful for detecting or measuring one or more enzymes which may be present in the sample, or for probing the substrate specificity of a selected enzyme. Examples of detection reagents include chromogenic substrates such as NAD/NADH, FAD/FADH, and various other reducing dyes, for example, useful for assaying hydrogenases, oxidases, and enzymes that generate products which can be assayed by hydrogenases and oxidases. For esterase or hydrolase (e.g., glycosidase) detection, chromogenic moieties such as nitrophenol may be used, for example.

In various embodiments, the analytes are drug candidates, and the detection reagents include a suitable drug target or an equivalent thereof, to test for binding of the drug candidate to the target. It will be appreciated that this concept can be generalized to encompass screening for substances that interact with or bind to one or more selected target substances. For example, the assay device can be used to test for agonists or antagonists of a selected receptor protein, such as the acetylcholine receptor. In a further embodiment, the assay device can be used to screen for substrates, activators, or inhibitors of one or more selected enzymes. The assay may also be adapted to measure dose-response curves for analytes binding to selected targets.

For further details on exemplary embodiments and configurations of microfluidic devices for biological testing with which the exemplary isolation (e.g., sealing) and/or flow control techniques may be utilized, reference is made to U.S. application Ser. No. 11/380,327, filed Apr. 26, 2006, having the same assignee, and entitled "Systems and Methods for Multiple Analyte Detection," the entire disclosure of which is incorporated by reference herein. It should be understood, however, that the devices described in that application are exemplary only and that the present teachings are useful in combination with a variety of devices configured to distribute a fluid throughout a distribution network of channels and/or chambers within a device, such as, for example, a microfluidic device. Such devices may include those useful in a variety of applications other than biological testing as noted herein.

All of the embodiments described herein may be modified to connect sample chambers and/or chambers of the flow control mechanisms, and to control the flow of the sample throughout the substrate in a variety of ways. The exemplary embodiments shown and described herein are intended to illustrate relatively simplified configurations for highlighting the principles of operation of the flow control mechanisms and skilled artisans would understand how to modify the configurations based on the present teachings in order to achieve desired flow and/or sample processing. Those skilled in the art would understand a variety of microfluidic device configurations with which the flow control mechanisms in accordance with the present teachings could be implemented to perform isolation of sample chambers and/or to control the fluid flow through various chambers, channels, and other sample containment portions of the device.

Various embodiments of the teachings are described herein. The teachings are not limited to the specific embodiments described, but encompass equivalent features and methods as known to one of ordinary skill in the art. Other embodiments will be apparent to those skilled in the art from consideration of the present specification and practice of the teachings disclosed herein. It is intended that the present specification and embodiments be considered as exemplary only.

What is claimed is:

1. An apparatus for controlling flow in a fluid flow path, the apparatus comprising:
   a fluid flow path configured to transport a liquid through the apparatus;
   a chamber comprising a first side, a second side opposite the first side, and a permeable material configured to expand upon contact with the liquid out of the chamber and be extruded into a portion of the fluid flow path wherein, in an expanded state, the material selectively allows a gas to pass therethrough while preventing a liquid to pass therethrough;
   a plurality of flow channels configured to draw at least a portion of the liquid into the chamber and into contact with the material via the first side of the chamber; and
   at least one structure comprising a plurality of passages, wherein the structure is proximate the second side of the chamber and is configured to control the rate at which the material expands from the chamber into the portion of the fluid flow path.

2. The apparatus of claim 1, wherein the material comprises a hydrogel.

3. The apparatus of claim 1, wherein the material comprises polyacrylamide.

4. The apparatus of claim 1, wherein the plurality of passages are capillary passages.

5. The apparatus of claim 1, wherein the at least one structure comprises a grating configured to extrude the material from the chamber into the portion of the fluid flow path.

6. A microfluidic device comprising:
   at least one apparatus as set forth in claim 1; and
   at least one additional chamber in flow communication with the fluid flow path, the at least one additional chamber being configured to receive the fluid for biological testing.

7. The microfluidic device of claim 6, wherein the at least one additional chamber includes a plurality of additional chambers in flow communication with one another via at least one channel.

8. The apparatus of claim 1, wherein the fluid flow path comprises a microfluidic fluid flow path.

9. An apparatus for controlling flow, comprising:
   a fluid flow path;
   a chamber comprising a first side, a second side opposite the first side, and a permeable material configured to expand, upon contact with a liquid, out of the chamber and extruded into a portion of the fluid flow path; and
   a plurality of flow channels configured to draw at least a portion of the liquid into the chamber and into contact with the material via the first side of the chamber;
   a structure configured to control the expansion of the material and to provide flow communication between the chamber and the fluid flow path;
   wherein the material selectively allows a gas to pass therethrough while preventing a liquid to pass therethrough,
   wherein the structure comprises a plurality of openings disposed between the second side of the chamber and the fluid flow path.

10. An apparatus for controlling flow, comprising:
    a fluid flow path;
    a chamber comprising a first side, a second side opposite the first side, and a permeable material configured to expand, upon contact with a liquid, out of the chamber and extruded into a portion of the fluid flow path; and
    a plurality of flow channels configured to draw at least a portion of the fluid into the chamber and into contact with the material via the first side of the chamber;
    a structure configured to control the expansion of the material and to provide flow communication between the chamber and the fluid flow path;
    wherein the material selectively allows a gas to pass therethrough while preventing a liquid to pass therethrough,
    wherein the structure comprises a plurality of passages proximate the second side of the chamber.

11. A flow control device comprising a plurality of apparatuses according to claim 1.

12. The apparatus of claim 1, wherein the plurality of passages is selected so as to control the rate of expansion of the material into the flow path.

* * * * *